US006928977B2

(12) United States Patent
Schwam

(10) Patent No.: US 6,928,977 B2
(45) Date of Patent: Aug. 16, 2005

(54) ADAPTER, TO INTERFACE COUNTER-ROTATING TORQUE PRODUCING ENGINE MECHANISMS WITH STATIONARY SUPPORT ACCESSORIES, FOR TORQUE FREE OUTPUT AND TORQUE SENSITIVE ENVIRONMENTS

(76) Inventor: Paul A. Schwam, 510 N. Stone Ave., Tucson, AZ (US) 85705

( * ) Notice: Subject to any disclaimer, the term of this patent is extended or adjusted under 35 U.S.C. 154(b) by 0 days.

(21) Appl. No.: 10/884,570

(22) Filed: Jul. 2, 2004

(65) Prior Publication Data
US 2005/0139189 A1 Jun. 30, 2005

Related U.S. Application Data

(63) Continuation-in-part of application No. 10/417,364, filed on Apr. 16, 2003, now Pat. No. 6,761,144.
(60) Provisional application No. 60/520,135, filed on Nov. 15, 2003, provisional application No. 60/381,625, filed on May 17, 2002.

(51) Int. Cl.$^7$ .................. B64C 11/00; B64C 27/00; F02B 53/00
(52) U.S. Cl. ................. 123/242; 123/44 R; 123/192.2; 416/128; 416/129; 418/61.2; 418/161; 418/164
(58) Field of Search ............... 123/44 R, 206, 123/207, 242, 192.2; 416/128, 129; 418/61.2, 418/86, 161, 164

(56) References Cited

U.S. PATENT DOCUMENTS

| 1,052,658 A | 2/1913 | Escher |
|---|---|---|
| 1,151,568 A | 8/1915 | Conill |
| 1,461,436 A | 7/1923 | Arrigoni |
| 1,561,424 A | 11/1925 | Exel |
| 1,594,035 A | 7/1926 | Bailey |
| 1,841,841 A | 1/1932 | Munn |
| 2,336,787 A | 12/1943 | Hockney |
| 2,419,787 A | 4/1947 | Muffly |
| 2,838,123 A | 6/1958 | Olcott |
| 2,988,065 A | 6/1961 | Wankel et al. |
| 3,554,666 A | 1/1971 | Conkle |
| 3,602,203 A | 8/1971 | Mowry |
| 3,799,473 A | 3/1974 | Bortel |
| 3,933,324 A | 1/1976 | Ostrowski |
| 4,056,746 A | 11/1977 | Burtis |
| 4,916,892 A | 4/1990 | Pope |
| 4,997,414 A | 3/1991 | Camara et al. |
| 5,112,191 A | 5/1992 | Strock et al. |
| 6,164,259 A * | 12/2000 | Brogdon et al. ......... 123/192.2 |
| 6,193,189 B1 | 2/2001 | Keever |
| 6,220,906 B1 | 4/2001 | Dubois |
| 6,761,144 B2 * | 7/2004 | Schwam ..................... 123/242 |

FOREIGN PATENT DOCUMENTS

FR 397499 5/1909

* cited by examiner

Primary Examiner—Sheldon J Richter

(57) ABSTRACT

The present invention is a novel hydraulic/electric, rotating interface for torque producing engines, including internal combustion engines, which enables a rigidly mounted motor to isolate the power/torque producing components from other stationary accessories, to provide advantageous crankshaft/block counter-rotational output, suitable for torque free power applications, torque free propulsion and torque sensitive environments.

1 Claim, 4 Drawing Sheets

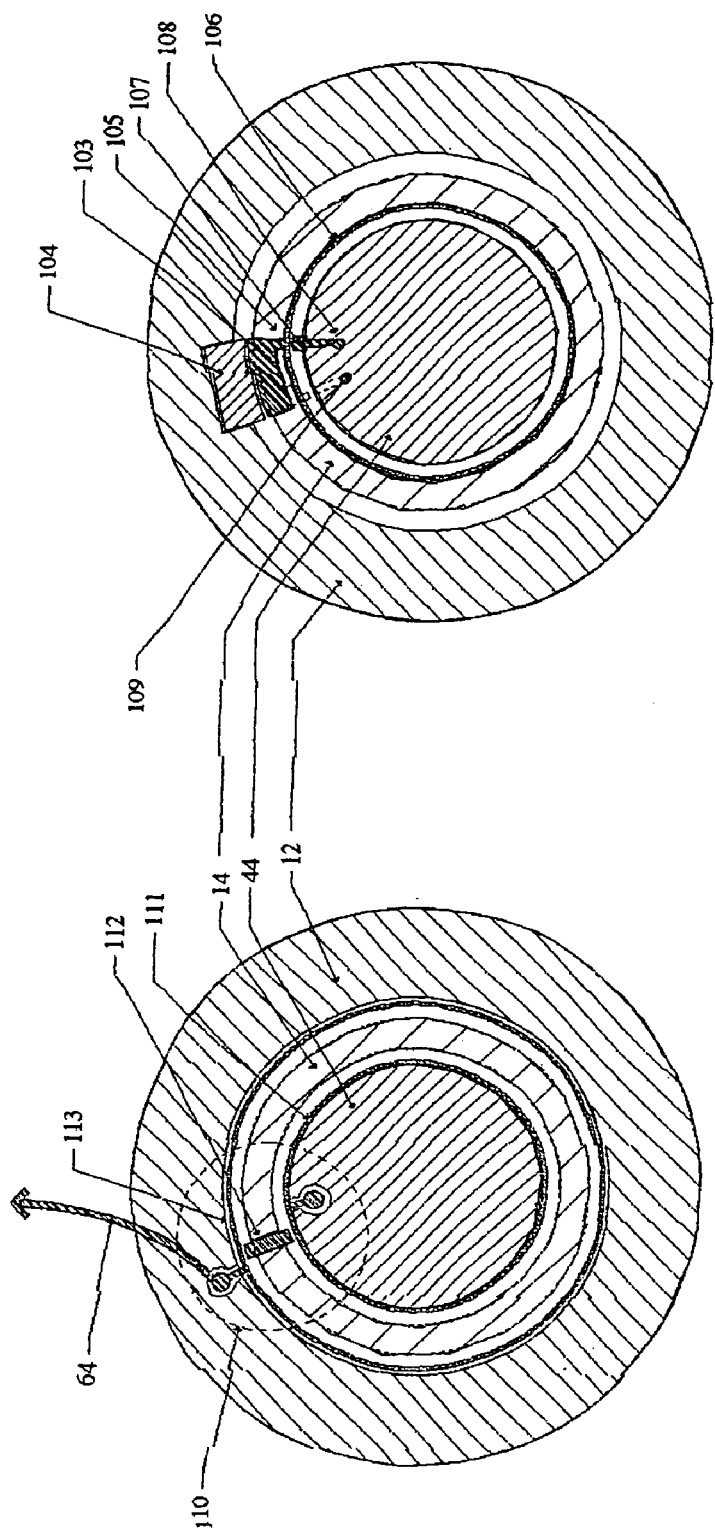

ADAPTER, TO INTERFACE COUNTER-ROTATING TORQUE PRODUCING ENGINE MECHANISMS WITH STATIONARY SUPPORT ACCESSORIES, FOR TORQUE FREE OUTPUT AND TORQUE SENSITIVE ENVIRONMENTS

RELATED APPLICATIONS

This application is based on U.S. Provisional Application No. 60/520,135, filed Nov. 15, 2003, and is a continuation-in-part of U.S. application Ser. No. 10/417,364, filed on Apr. 16, 2003 now U.S. Pat. No. 6,761,144, which is based on U.S. Provisional Application No. 60/381,625, filed on May 17, 2002.

BACKGROUND OF THE INVENTION

1. Field of the Invention

This invention is related in general to the field of mechanical rotary adapters and, in particular, to a novel hydraulic/electric rotating interface for torque producing engines, including internal combustion engines, which enables the power/torque producing components to be isolated to a remote location, for automatic, dynamically balanced, counter-rotational output, apart from stationary engine mount and supporting accessories. Stated another way, This invention is related to the field of fixed mount engines, to include a unique rotation interface allowing the rotational torque producing mechanisms to be remotely isolated for balanced counter-rotating output, suitable for torque free power applications, torque free propulsion and torque sensitive environments.

2. Description of the Related Art

All engines share the characteristic of transforming energy into the useful motion, often into the useful rotation of a shaft. In reaction to the useful energy rotating a shaft, an equal unused energy is exerted against a stationary (stable) portion of the engine block, typically mounted to a mass large enough to be fixed to the earth by gravity wherein any and all reactions can be opposed so overwhelmingly, that the engine block is considered fixed and stable. For example, internal combustion engine, the primary example illustrated in the present patent, convert pressure generated by the combustion of a fuel into the useful rotation torque of a shaft, which is typically countered by a block ultimately fixed to the earth for stability. All motors, Electro-magnetic, hydraulic, etc. typically require the stability of the earth in order to provide output.

Engines suspended in fluid environments are not as easily stabilized by gravity in the same manner. In aviation, the primary example illustrated in the present patent, because engine/propeller combinations are attached to the body of the aircraft, as a result of the torque produced by the operation of the engine on the propeller, an opposite reactive torque is transmitted through the engine mount to the airplane causing the plane to roll opposite the direction of the propeller, and out of control unless counteracted. A submarine experiences a similar effect within underwater environments, as do spacecraft within outer space environments.

Aviation engineers, for example, have long searched for ways to reduce the instability that results from this reactive torque by counter-rotating propulsion.

Dual engine solutions can obviously be achieved with any form of internal combustion engine by mounting a pair of engines for coaxial, counter rotational output which would become mechanically balanced if the two engines were throttled in unison. In this case, the two energy output sources are not inherently (dynamically) balanced, as it would be if the crankshaft and block were allowed to freely counter-rotate, instead the primary output shaft is mechanically countered with an opposing output shaft. Therefore, with the engine securely mounted, an imbalance in propeller loads would immediately cause an instability in the aircraft.

Single engine solutions typically involve complex engine structures to support two propellers rotating in opposite directions to each other, which theoretically results in a greater amount of propelling force and, in some cases, a substantially perfect dynamic torque balance. To that end, the combustion-chamber/crankcase configuration of internal-combustion engines has been modified in various manners over the years in attempt to attain the theoretical advantages of a balanced counter-rotating engine/propeller system.

See, for example, the solutions provided by Escher (U.S. Pat. No. 1,052,658), Conill (U.S. Pat. No. 1,151,568), Hockney (U.S. Pat. No. 2,336,787), Muffly (U.S. Pat. No. 2,419,787), Olcott (U.S. Pat. No. 2,838,123), Conkle (U.S. Pat. No. 3,554,666), Keever (U.S. Pat. No. 6,193,189), and Canton (French Patent No. 397,499). None of these patents describe an adapter internal to the engine to specifically separate the torque producing components from the mount and the other accessories not directly producing torque. None include a hydraulic pump/motor assembly for hydraulic linkages between stationary and rotating components. The mechanisms of Ostrowski (U.S. Pat. No. 3,933,324), Reynaud (U.S. Pat. No. 4,997,414), describe counter-rotating gear mechanisms from a stationary engine source. No engine torque is addresses in these examples. Burtis (U.S. Pat. No. 4,056,746) shows a counter-rotating mechanism but shows a single output. Burtis is combining the rotating torque of the field and rotor into a single output.

One less suitable approach, shown in previous patents describe single engines designed to balance opposite torque by means of two counter-rotating output shafts connected to multiple crankshafts originating from a single stationary engine block. A rotary adapter is not necessary in these cases; however, again, the two energy output sources are not inherently (dynamically) balanced, as it would be if the crankshaft and block were allowed to freely counter-rotate, and again, an imbalance in propeller loads would immediately cause an instability in the aircraft.

The most suitable approach to counter-rotational output shown in previous patents describe single engines with a rotating crankshaft cooperating with a counter-rotating combustion-chamber enclosure. This approach does offer dynamically balanced output. Unfortunately, lacking a rotary interface, these patents necessarily involve complicated engine mounting, inlet/exhaust porting and lubricating systems that have greatly affected their practical implementation. The inherent complexity, of counter-rotating the entire engine, has prohibited the practical success of the counter-rotating shaft/block approach.

The only successful counter-rotating engine application utilizes very small, simplified, 2 cycle model airplane engines, similar to the Cox 0.049 engine. Although a-typical, these engines have been mounted, axially concentric to the hub of a larger, helicopter style propeller wherein the adverse torque of the block is dissipated through the rotation of the helicopter propeller. Their successful counter-rotational operation is due to an absence of electrical and mechanical components, and other accessories required for larger engines. They also lack a rotating adapter and therefore are severely limited in operation. These engines are non-sustaining and non-controlled during counter-rotational operation; i.e. engines are started with auxiliary starting apparatus and the fuel flow adjusted with the engine in a static position. Once the block is released for counter-rotation, no further access to the motor is possible. Their ability to function at all is largely due to their very small size, which geometrically subjects them to lesser amounts of centrifugal force. Progressive increases in centrifugal force, concurrent with either increases in engine size, or higher block RPMs, prohibit engine functionality beyond the hobbyist scale.

In summary, the Historic obstacles to a successfully operating, full size, full function, counter-rotating engine is due to two basic reasons. The first being the adverse effects of centrifical force acting upon the mechanism itself which converts expanding gas energy into rotational shaft energy, which inhibits or prohibits the mechanism from functioning properly. For example, the weight of engine oil, acting under centrifical force, commonly accumulates at the back side of the pistons and directly opposes the pressures of combustion necessary for rotational output.

The second historic impediment, common to previous internal combustion engine types, is the overall complexity of the engine, including accessories, which once compounded by the effects of centrifugal force become unable to contribute its required function to the engine as a whole rendering the whole engine in-operational. Stated another way, the counter-rotating mechanical action required for balanced output, when applied to other required engine accessories, prohibits their contribution to engine operation and therefore prohibits entire engine operation.

It is recognized certain specific modifications must be made to each individual combustion chamber configuration (such as dealing with engine oil under centrifical force) in order to overcome the first historic impediment and, finally achieve a functional counter-rotating engine. The specific combustion chamber modifications are engine specific, and will not be detailed within the present application except as necessary to describe devices and configurations necessary to communicate with the stationary accessories.

Common to all engines, in order to overcome the second historic impediment, an opportunity exists to re-configure torque producing engines, including internal combustion engines, to specifically include a unique rotation interface, which permits the stationary mounted engine and accessories, to remain stationary and simultaneously co-operate with a remotely located, balanced, counter-rotating output shaft and combustion chamber. Therefore the rotary adapter serves a second function to transmit power to a stationary location to drive non-rotating accessories.

Finally, it should be noted, that although the primary function of aviation power plant is propulsion, there are secondary functions including electric and hydraulic power generation, which typically can not practically be achieved within a counter rotating environment.

The present invention is limited to the rotary adapter. The preferred embodiment includes a 2 cycle engine, selected for appropriate complexity to accurately demonstrate the required complexity of the interface. The specific modifications to the 2 cycle engine energy conversion mechanism will not be described in detail, except where necessary to describe the adapter. It is understood different combustion chamber configuration, may require additional electrical and or hydraulic inter-connections, which are simply expansions of the rotating connections shown in the present invention.

BRIEF SUMMARY OF THE INVENTION

The primary objective of this invention is the addition of a rotating adapter component to Power/torque producing engines to allow stationary components and counter-rotating components to co-operate to permit advantageous counter-rotational output of a fixed-mount engine for suitable applications.

Another objective of this invention is an adapter which torsionally isolates the torque producing components for automatic, dynamically balanced torque output regardless of the dynamic loads or RPM's of the counter-rotating output.

Another objective of this invention is to re-configure Power/torque producing engines isolating the torque producing components for counter-rotational output and adding an interface to permit other stationary accessories to work in sequenced operation with counter-rotating components.

Another objective of this invention is to connect the stationary engine components to the power/torque producing engine components by adding an rotatable interface including hydraulic and electric circuits which function across a rotating mount.

Another objective of this invention is to re-configure Power/torque producing engines by isolating the torque producing components for counter-rotational output suitable for torque sensitive power applications.

Another objective of this invention is to re-configure Power/torque producing engines by adding an interface which, isolates the torque producing components for suitable output in torque sensitive environments wherein no adverse torque is transmitted across the interface to the engine mount.

Another objective is to combine a counter-rotating engine block assembly with a counter-rotating hydraulic pump/motor assembly which concentrically cooperating with the counter-rotating engine block and crankshaft.

Another objective of the invention is an engine with a counter-rotating block assembly, torsionally unrestrained from all other components the engine required for proper function.

Another objective of the invention is a rotating adapter which links a counter-rotating block assembly, to all other fixed accessories of the engine via the non-rigid, fluid properties of hydraulic systems or the non-rigid voltage spanning properties of electro-static, or electro-magnetic conduction.

Another objective of the invention is a rotating adapter which hydraulically and electrically links a counter-rotating assembly, to a fixed assembly, wherein the two assemblies can cooperate with each other, each from within separate torsional environments.

Another objective of the invention is a rotating adapter which hydraulically and electrically links a counter-rotating assembly, to a fixed assembly, wherein the two assemblies can cooperate with each other to generate balanced torsional, electrical and/or hydraulic output, wherein, by virtue of the rotating adapter. No adverse torsional output exists within either environment.

Another objective of the invention is a rotating adapter which links a counter-rotating engine block/generator assembly, to a stationary electrical outlet, allowing advantageous electrical output located within torque a sensitive environment.

Another objective of the invention is a rotating adapter which hydraulically links a counter-rotating engine block and hydraulic pump assembly, to a fixed hydraulic load, allowing advantageous hydraulic pressure output within torque sensitive environments.

Another objective of the invention is a rotating adapter which hydraulically and electrically links a counter-rotating assembly, to a fixed assembly, wherein the two assemblies can cooperate with each other, and wherein the counter-rotating half of the engine is employed to generate torsionally balanced thrust in a fluid environment, such as water or air, wherein, by virtue of one or more rotating adapters, no adverse torque can be generated within either the fixed or the rotating environments.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

BRIEF DESCRIPTION OF THE DRAWINGS

FIG. 4 is an enlarged sectional view, as seen from line 4—4 of FIG. 2, of the high voltage, electro-static, non-contact electrical conductor components of the rotary interface.

FIG. 5 is an enlarged sectional view, as seen from line 5—5 of FIG. 2, of the low voltage, electro-magnetic position sensor and cooperating rotary electrical contacts of the rotary interface.

DESCRIPTION OF THE PREFERRED EMBODIMENTS OF THE INVENTION

Figure 1:
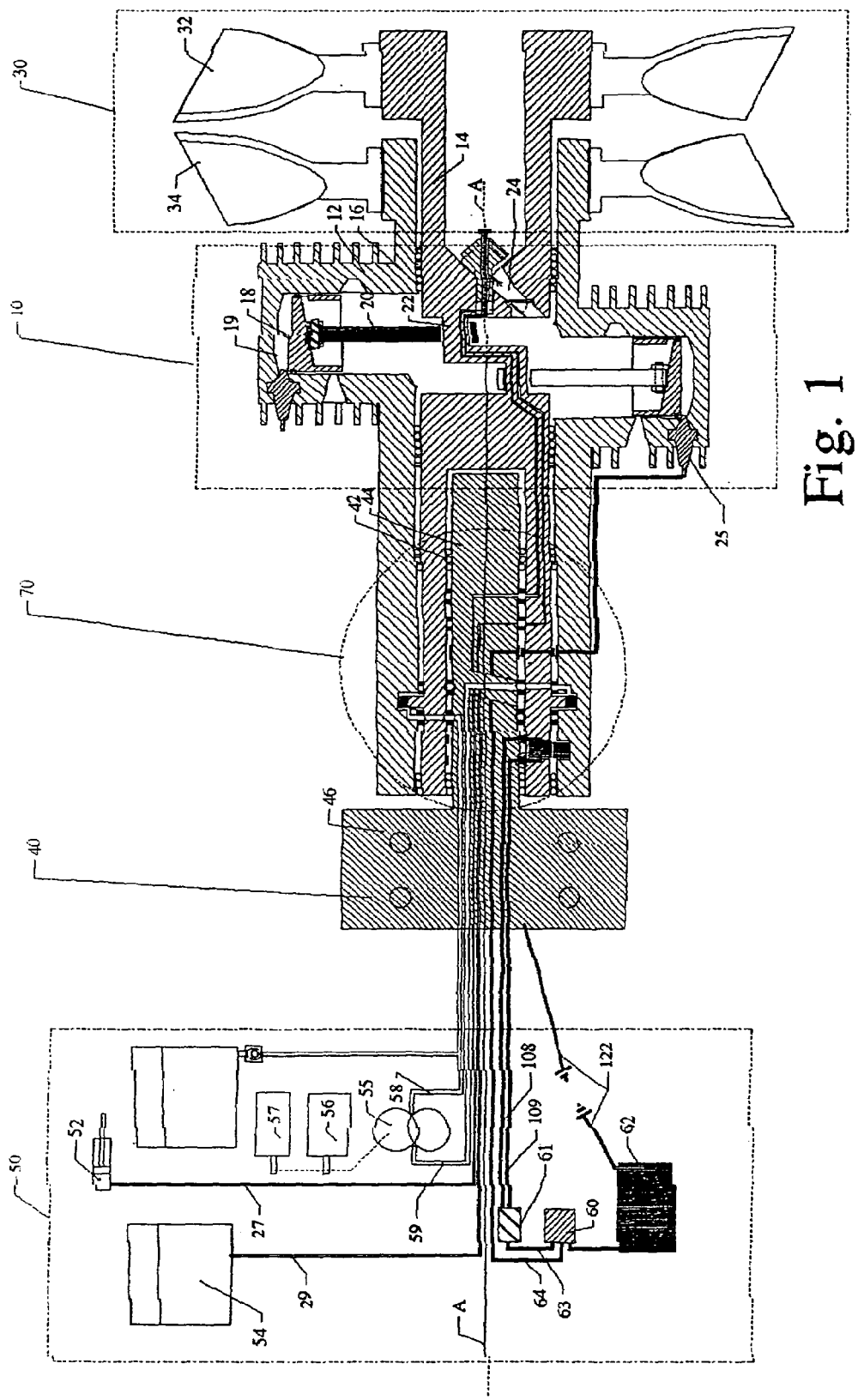
FIG. 1 is an axial section diagram of a typical, 2 cycle, internal combustion engine, a set of counter-rotating propellers, an engine mount, remote engine accessories, and a rotatable interface.

According to the invention, FIG. 1 the preferred embodiment illustrates a unique engine configuration comprised of a coaxially and counter-rotating engine block/crankshaft assembly 10, individually connected to a set of counter-rotating propeller blades 30, where the counter-rotating assemblies 10 and 30 are rotatably mounted onto a stationary spindle 40, and rotatably inter-connected to the remaining stationary engine components 50 through the use of a coaxial, counter-rotating hydraulic pump/motor and electrical position sensor assembly 70.

As illustrated in FIG. 1 an engine 10 according to the invention comprises an engine block 12, including a plurality of radially disposed cylinders 13, centered around a central axis A, an output shaft 14 rotatably mounted through the block 12, through annular bearings 16, to rotate about the central axis A. As those familiar with 2 cycle engines know, an engine includes sets of pistons 18 and connecting rods 20, journaled to corresponding crankshaft off-sets 22, wherein the pistons 18, each slidably received within a corresponding cylinder 13, which all together, functionally convert the pressures of combustion into useful rotating output.

As shown in FIG. 1, the engine block 12 rotatably mounted about the output shaft 14, through annular bearings 16, rotatable as well about the central axis A. The output shaft 14 is rotatably mounted through annular bearings 42, to a stationary spindle 44 including a spindle mount 46. A first propeller 32 (shown partially cut-out in the figure) is fixed to an open portion of the output shaft 14 to convert its rotation into useful propulsion. A second propeller 34 is fixed to an open portion of the engine block 12 to convert its opposing rotation into useful propulsion.

It is noted that as a result of this configuration each propeller 32 and 34 rotates around the engine's central axis A, about the structure to which it is attached (i.e., the block 12, and the shaft 14, respectively). The relative power of the two is determined by the mechanical conversion of the pressures of combustion into rotational motion equally distributed between the shaft 14 and block 12. The speed of each propeller 32 or 34, relative to the air, is determined by the energy within the mass, geometry, and dynamic loads of that propeller, including any associated structures, as it rotates within the ambient air.

Referring to FIG. 1, As those familiar with the art of two cycle engines recognize, a port 24 connecting the atmosphere with the crankcase cavity allows air to be drawn into the engine for combustion. The present invention does not include the details of conventional carburetion except to describe, according to the invention, a hydraulic throttle control comprising a master cylinder 52 located in a fixed environment (see FIG. 1), with the fixed engine accessories 50, which is interconnected to a co-operating slave cylinder 26 (see FIG. 2), located in a rotating environment, at the throat of the intake port 24. The master cylinder 52, and the slave cylinder 26 are interconnected by a hydraulic line 27 which passes through a rotary fluid connection 72 comprised of an annular channel 74 and a pair of rotary seals 76, as shown in FIG. 2.

A similar contribution of the present invention, is in contribution, a stationary fuel tank 54 (shown in FIG. 1) is interconnected to a fuel nozzle 24 located at the intake port 24, (shown in FIG. 2) by means of a fuel line 29 passing through a rotary fluid connection 78, comprised of an annular channel 80 and a pair of rotary seals 82.

Referring to FIG. 1, another contribution of the present invention is the interconnection of a first conventional gerotor type oil pump/motor 55, located within the fixed environment 50, which cooperates with the engine starter motor 56 and an electrical generator 57, with a second gerotor type oil pump/motor 80, located within the counter-rotating environment, and operationally and axially concentric with, and adjacent to, the block 12, and the output shaft 14.

Figure 2:
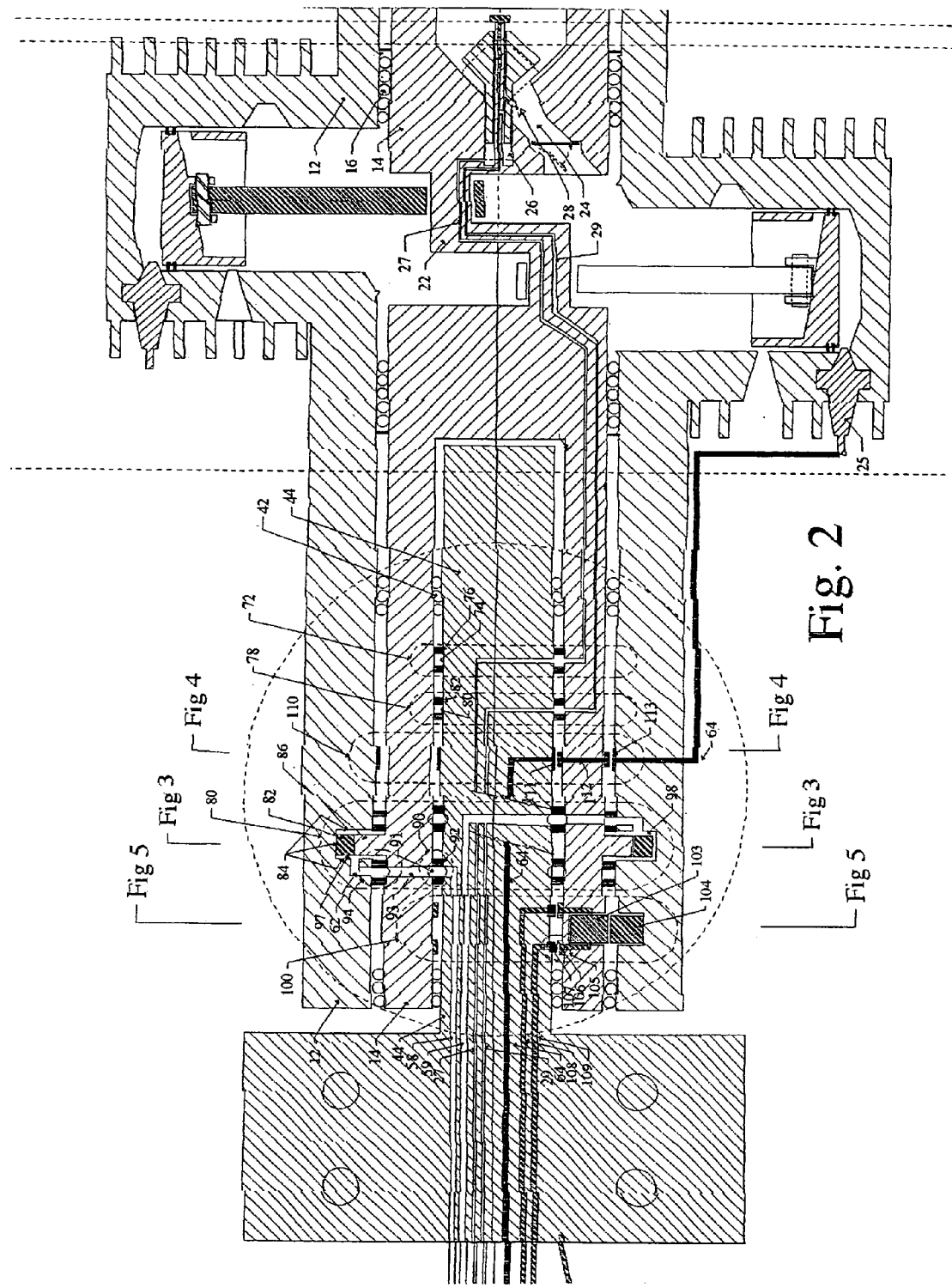
FIG. 2 is a enlarged axial view of the rotating interface.
Figure 3:
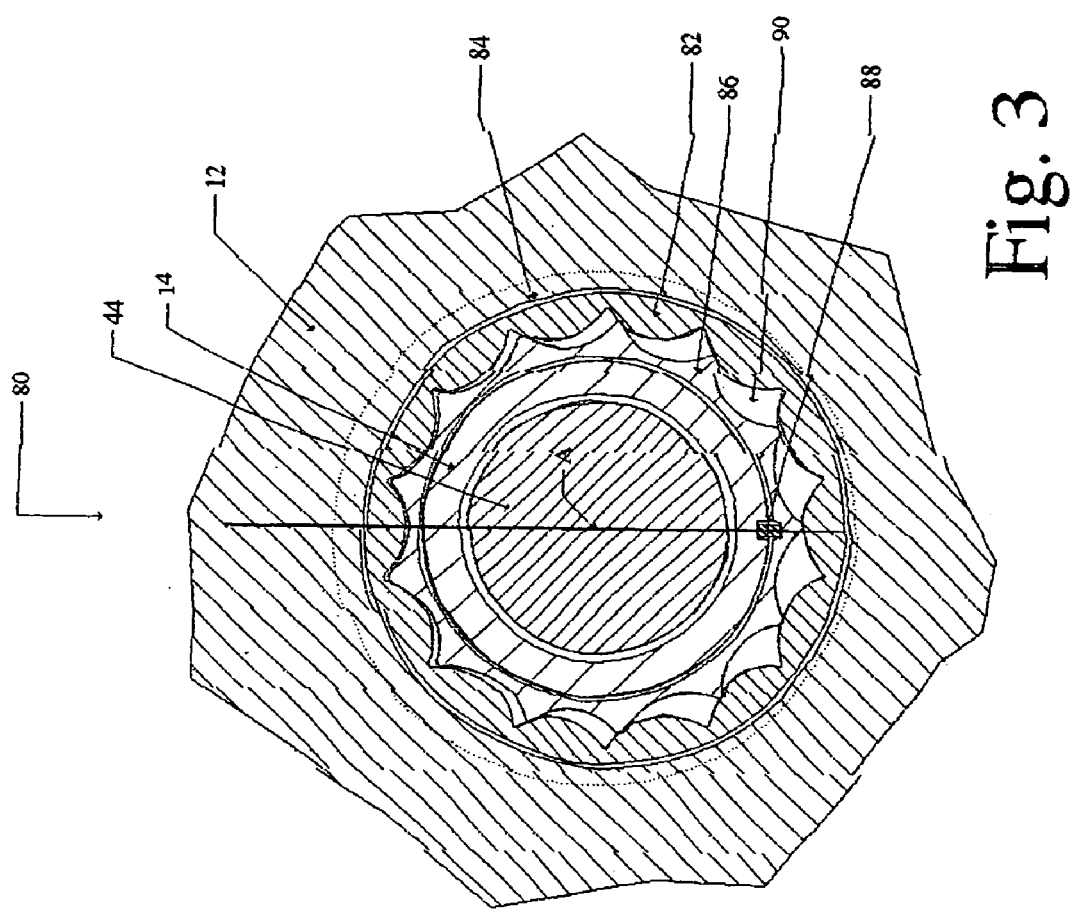
FIG. 3 is an enlarged sectional view, as seen from line 3—3 of FIG. 2, of the counter-rotating gerotor-type pump/motor assembly according to the invention.

As illustrated in the section views of FIG. 2 and FIG. 3, the pump/motor 80 includes an outer stator ring 82 free floating within a cooperating, eccentricly journaled cavity 84 in the engine's block 12. An inner rotor 86, with one lobe fewer than the outer stator 82, is concentrically mounted to the output shaft 14 by means of a key 88. As a result of this configuration, as the output shaft 14 rotates with respect to the block 12. During operation, one half of the free space 90 between the stator 82, and the rotor 86, provides suction while the other half provides pressure.

Referring to FIG. 1, in order to start the engine, a rigidly mounted starter motor 56 operates a hydraulic pump 55 to pressurize the oil line 58 leading to the block 12 of the engine 10, traversing of a first rotary connector 90 (see FIG. 2), which typically includes an annular channel 91 defined by two O-ring seals 92 between the spindle 44 and the shaft 14. The channel 91 is connected by means of one or more radial ducts 93 through the body of the shaft 14, to a second rotary connection 94, similar in configuration to rotary connection 90, which leads to a duct 62, through the block 12, which feeds the suction side of the embedded hydraulic pump/motor 97 mounted between the output shaft 14 and the block 12 of the engine 10 (See FIG. 2) such that oil pressure exerted on the suction side 97 of the embedded oil pump/motor 80 causes their relative rotation and counter-rotation, thereby cranking the engine to start. The oil from the high pressure side 98 of the embedded pump/motor 80 is returned to the remote pump/motor 55 similarly by means of another oil line 59.

In turn, the interconnected embedded motor 80 and remote motor 55 most of the time, functions in reverse as an electrical generator. Thus once the engine is running, the oil flow caused by the embedded pump/motor 80 turning the remote pump/motor 55 may be use to produce electricity with the generator 57.

The embedded hydraulic pump/motor 80 can additionally be used for lubricating oil for counter-rotatable engines requiring pressurized lubricating systems.

Still referring to FIG. 2, another significant contribution of the present invention is and plurality of coaxial rotary electrical contacts located at the rotary interface, including a low voltage, combustion chamber/crankshaft electro-magnetic position sensor 100, and a second set of high voltage electro-static contacts 110, all required to transfer properly timed ignition charges to the spark plugs 25, of the engine 10.

Referring to FIGS. 2 and 5, the electrical ignition charge required to ignite the fuel air mixture (familiar to those knowledgeable in the art) is conventional in every way to a standard capacitor discharge ignition with two exceptions; 1. The preferred embodiment requires both an electromagnetic sensor 103, and the cooperating magnet 104, to be cooperatingly mounted to free portions of the counter-rotating crankshaft 14 and the combustion chamber 12. The electromagnetic sensors 103 must be designed to function unaffected by centrifical force, and transfer an electrical signal from the engine 10 to a processor 61, (see FIG. 1) across a plurality of rotary contacts 105, similar in construction to a typical positive contact brush/commutator configuration. The low voltage rotary contact 105, includes a spring loaded brush 107, connected at one end to a sensor wire 108, at the other end, extending from the outer surface of the stationary spindle 44, to maintain contact with a commutator ring 106, mounted on an inner surface of the shaft 14, the commutator ring 106 is connected to the position sensor 103, mounted in the shaft 14. One or more additional sensor wires 109, also leading from the processor 61, interconnect to the sensor in the same manner.

A second exception to the typical capacitor discharge ignition system, as described in the preferred embodiment, and as shown in FIG. 1, requires the high voltage charge from the capacitor 60 leading to the spark plug 25, conducted through an insulated wire 64, is required to pass through a high voltage rotating contact ring assembly 110. Referring to FIGS. 2 and 4, the high voltage contact ring assembly 110, includes a first ring 111, located on an outer surface of a free portion of the fixed spindle 44. A second ring 113 is located on an inner surface of the engine block 12. A co-operating, insulated electrical conductor bridge 112, is radially mounted through the crankshaft 14. The contact rings 111 and 113 and bridge 112 are aligned and positioned wherein gaps between components exist which are dimensionally less than the dimension of the gap on the spark plug 25. The high voltage electro-static ignition charge arcs between the contact rings 111 and 113, through the bridge 112, to the spark plug 25 as a normal function of the ignition operation without conductor components being in physical contact.

The timing of the ignition charge from the capacitor discharge coil 60 (FIG. 1) is triggered by the electromagnetic sensor 103, (FIG. 2) located within the crankshaft 14. which co-operates with a magnet 104, located the block 12. The impulse signal, generated by the sensor 103, is transmitted through a plurality of rotating contacts 105, from the shaft 14, through the spindle 44, through a plurality of conductors, 108 and 109, to a signal processor 61 (see FIG. 1), located within the fixed environment 50, which in turn signals the capacitor 60, through a conductor 63, to trigger an appropriately timed discharge from the stationary capacitor discharge ignition coil 60, energized by a battery 62, through a wire 64 leading to the spark plug 25, by arcing between a rotating electrostatic conductor 110, leading to the spark plug 25.

The spark plug 25, the shaft 14, and the block 12 are all grounded to the spindle 44 through an uninsulated rotary contact (not shown), similar in construction to the high voltage contact 110, with an exception being physical contact is maintained between these components instead of gaps maintained. Finally, a ground strap 122, shown in FIG. 1, connects the spindle 44 to the battery 62.

Various changes in the details, steps and components that have been described may be made by those skilled in the art within the principles and scope of the invention herein illustrated and defined in the appended claims. For example, the general concepts of the invention could be implemented in equivalent fashion, though not preferred, by different mounting arrangements to stationary structures.

Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

I claim:

1. A means rotationally separating an engine from accessories to allow counter-rotational output including
    a) A stationary spindle rigidly fixed at one end containing within the mass of the spindle a plurality of hydraulic ducts and electrical conductors open at both ends of the spindle, open at the fixed end leading to the stationary accessories and, open at the free end, to a mountable, journaled surface concentric to the central axis of the engine, and which cooperate with electrical conductors and hydraulic ducts within the crankshaft and or block,
    b) a rotating torque producing engine block including an output shaft counter-rotatingly mounted to a free end of the stationary spindle allowing shaft and housing to counter-rotate about the central axis of the spindle,
    c) A rotatably mounted gerotor style hydraulic pump/motor wherein
        1) the output shaft of the pump/motor is concentrically fixed to the output shaft of the motor,
        2) the pump/motor housing concentrically fixed to the housing of the engine,
        3) a free surface of the pump/motor housing journaled concentric to the motor output shaft, rotatably received by a mating surface of the spindle, and aligned with ducts leading from the spindle surface to the suction and high pressure ports of the Gerotor pump/motor functionally aligned to the suction/high pressure ducts of the hydraulic ducts of the spindle,
    d) A pair of cooperating crankshaft/block position sensors including; a rotating electro magnetic coil and a counter-rotating, cooperating magnet.

* * * * *